United States Patent [19]

Gamblin

[11] 4,131,898

[45] Dec. 26, 1978

[54] INTERLACING RECORDER

[75] Inventor: Rodger L. Gamblin, Oakwood, Ohio

[73] Assignee: The Mead Corporation, Dayton, Ohio

[21] Appl. No.: 833,579

[22] Filed: Sep. 15, 1977

[51] Int. Cl.[2] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,828,355 | 8/1974 | Wick et al. | 346/75 |
| 4,063,254 | 12/1977 | Fox et al. | 346/75 |

*Primary Examiner*—George H. Miller, Jr.

*Attorney, Agent, or Firm*—Biebel, French & Nauman

[57] ABSTRACT

A jet drop recorder has a plurality of print heads, which print contiguous bands of graphic matter upon a sheet of printing material mounted on a rotary support. Each print head projects a row of spaced jets toward the printing sheet, and the jets print non-contiguous spiral tracks on the sheet. The individual jets are so spaced relative to the track width that the combination of paper rotation and advancing movement of the print heads causes side-by-side overlapping or interlacing of the spiral tracks. Thus each print head prints a steadily widening solid band. The heads each have the same number of jets and the same jet spacing so as to achieve identical track interlacing patterns. The distance between the print heads is adjusted such that the full width printed bands interlace at their edges. This prevents printing of an unsightly seam along adjoining boundaries of two adjacent bands.

4 Claims, 5 Drawing Figures

INTERLACING RECORDER

BACKGROUND OF THE INVENTION

This invention relates to jet drop printers which print graphic information upon a sheet mounted on a rotary support member. In such recorders one or more print heads are mounted above the sheet and advance axially as the sheet is rotated repetitively thereunder. A typical recorder of this type is described in detail in Van Brimer et al U.S. Pat. No. 3,588,906.

The recorder of Van Brimer et al generates only a single jet for recording an image on the sheet. Such single jet operation is exceedingly slow and is impractical for many applications, such as office copying. Therefore it has been proposed that recording be carried out by means of apparatus capable of producing a plurality of jets. The difficulty with this is that the jets cannot be generated side-by-side with a sufficiently close spacing to achieve high resolution printing. Various techniques for circumventing the spacing problem are disclosed in Cahill et al 3,689,693, in Van Hook 4,009,332, in Paranjpe et al Ser. No. 789,417, and in Bruce — IBM Technical Disclosure Bulletin Vol. 18, No. 12, May, 1976, page 3917.

In the Cahill arrangement there are provided a plurality of print heads, each of which produces a single jet. The heads are joined together for common stepping in the axial direction, so that each jet prints a solid band of graphic information. As the heads are stepped in the axial direction, the printed bands grow continually wider until they join. Printing of a full image is then complete, and axial stepping is terminated.

One of the problems with the Cahill arrangement has been that it is difficult to bring the printed bands together in exact registration. Such misregistration results in a visually apparent "seam" at boundaries between adjacent bands.

The arrangement of Paranjpe et al solves most of the problems of the prior art. As taught in Paranjpe et al a large number of spaced jets may be generated by a single head and printed in a spiral interlacing fashion. In order for this arrangement to work it is taught that the spacing between the jets should be such that it is equal to some number of image track widths which has no integer other than one as a factor in common with the number of nozzles. The speed of axial advance should be so related to the speed of drum rotation that during one drum rotation each nozzle is advanced an axial distance equal to a number of track widths corresponding to the total number of nozzles. While this enables printing at high speed and high resolution, it requires a print head which produces a fairly large number of jets.

Such heads tend to be somewhat expensive because of quality control problems associated with production of the necessary components. For instance, it is relatively easy to manufacture a high quality orifice plate or a high quality charge ring plate for production of ten or fifteen jets. As the number of jets increases cumulative tolerance errors also increase and the percentage yield of satisfactory parts decreases substantially. This is an important factor in applications such as office copiers, wherein cost must be minimized.

There is also a problem which arises due to the fact that the orifice plate must be moved from a position totally offset on one side of the paper to a position totally offset on the other. Thus the total travel distance for the print head is equal to the length of the drum plus twice the length of the orifice plate. For a high speed system the orifice plate is necessarily quite long, and thus a rather considerable amount of print head movement is required. This movement distance in turn creates a requirement for rather high print head movement speeds.

Van Hook and Bruce disclose jet drop printers which produce a series of circumferentially spaced jets. Bruce's jet producing nozzles are arranged in a single ring extending circumferentially around the printing drum, while Van Hook's nozzles are arranged in a plurality of rows. Either of these devices requires a data system capable of producing relatively long switching delays corresponding to the time of drum rotation from the first to the last circumferentially spaced printing position.

SUMMARY OF THE INVENTION

This invention provides a high speed, high resolution ink jet recorder at moderate cost by combining a plurality of print heads of the type disclosed in Paranjpe et al, Ser. No. 789,417. Each of the heads conforms to the teachings of Paranjpe et al but has a reduced number of jet forming components. The overall number of jets produced by the plurality of heads provided in accordance with this invention may be the same as the number of jets produced by the single head of Paranjpe.

In accordance with this invention the heads preferably are all alike in the number of jets and in the jet spacing. The spacing of jets within a head is selected to be a distance equal to a number of track widths having no factor other than one as a common factor with the number of jets produced by one of the heads. Moreover the heads are spaced apart for interlacing of the printed bands produced by the different heads. Preferably the heads are uniformly spaced along an axially extending line at a spacing equal to an integral number of axial advances. One axial advance is the distance that each of the heads moves during one rotation of the drum, and this distance should be equal to the width of one printed track multiplied by the number of jets in one head. Accordingly each head prints a continually widening band which has unprinted tracks near the beginning edge but which is otherwise fully printed throughout. As each head completes its printed band it prints additional tracks, which extend across into the unprinted tracks near the edge of the adjacent band. The end product is a large printed area produced by the cooperative effort of a plurality of print heads without any visually apparent seams.

DESCRIPTION OF THE PREFERRED EMBODIMENTS

Figure 1:
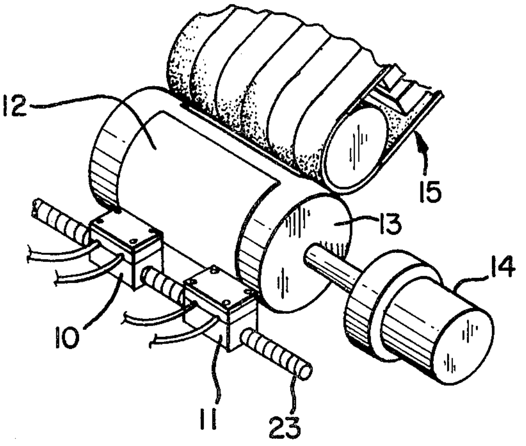
FIG. 1 is a schematic illustration of a pair of print heads printing cooperatively in accordance with this invention.

In accordance with this invention jet drop printing is carried out by a plurality of print heads, each of which is constructed in accordance with the teachings of Paranjpe et al, Ser. No. 789,417, the details of which are fully described therein. FIG. 1 illustrates two such print heads 10 & 11 mounted on an axially extending worm 23 for printing a sheet of paper 12.

Sheet 12 is mounted on a drum 13 driven by a drive motor 14. As described in the above mentioned Paranjpe et al application, worm 23 is rotated to cause axial advancing of the heads 10 in correct amount for each rotation of drum 13. A vacuum belt system 15 delivers unprinted sheets to drum 13 and removes printed sheets therefrom upon completion of printing. It will be understood that paper handling is accomplished as taught by Paranjpe et al and elsewhere in the prior art.

Figure 2:
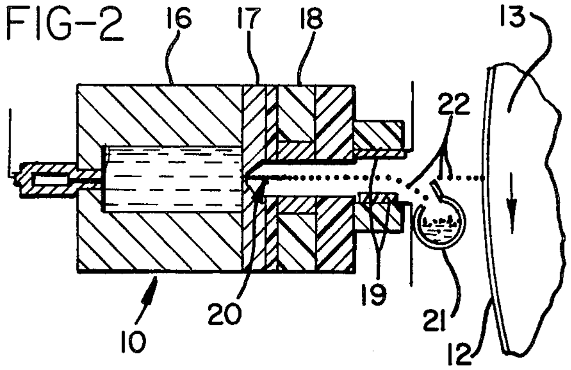
FIG. 2 is a cross-sectional illustration of a print head.

As illustrated in cross section in FIG. 2, a print head 10 (print head 11 being of identical construction) generally comprises an ink manifold 16, an orifice plate 17, a charge ring plate 18, a pair of deflection electrodes 19 and a catcher 21. The operation of such a print head is well known as described in Paranjpe et al and other references mentioned therein. It is sufficient for the present purposes to note that print head 10 creates a row of jets 20, which are stimulated to break up into drops 22. Some of the drops 22 are charged by charge plate 18 for deflection by a deflection field established between plates 19. Drops which are so deflected are caught by the catcher 21, while drops which are uncharged and therefore undeflected deposit upon sheet 12. Charge control signals for charge plate 18 may be generated by arrays of scanning photosensors as taught by Paranjpe et al or read from a magnetic tape as taught by Cahill et al 3,689,693.

Figure 3:
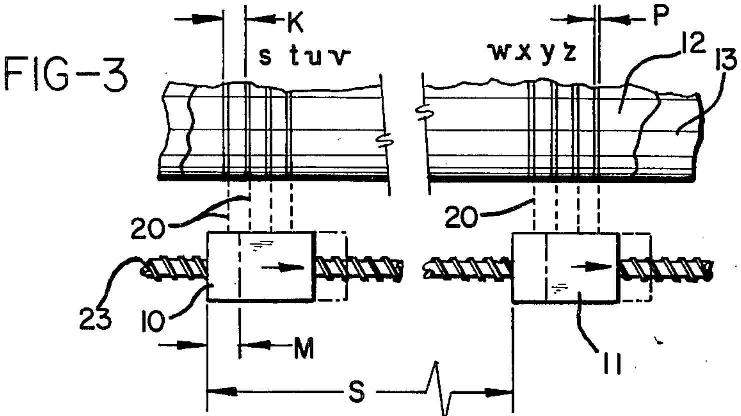
FIG. 3 illustrates the geometrical relationship between two cooperatively operated print heads.

FIG. 3 illustrates the cooperative printing action of the print heads 10 and 11. For purposes of this illustration each of heads 10 and 11 is shown as producing four jets 20. The four jets produced by print head 10 print four helical bands designated by the letters s, t, u and v. Similiarly print head 11 prints four helical bands w, x, y, and z. Each of the printed bands has a width P, and the distance between adjacent bands is K. The distance between heads 10 and 11 is S, and during one rotation of drum 13 the two print heads are transported along worm 23 a distance M.

As taught by the above mentioned Paranjpe et al application, each of print heads 10 and 11 is able to produce a solid printed image if the distance K is equal to a number of track widths having no factor other than one as a common factor with the number of jets produced by one of the heads. For the special case of a head producing four jets, the distance K, expressed in terms of the track width P, must have no factor other than 1 as a common factor with the number 4. Thus the distance K may be 3P, 5P, 7P, 9P, 11P, etc. Table I sets forth the permitted nozzle spacing for any number of nozzles from 2 through 9. It should also be noted that for proper operation the distance M should be equal to the distance P multiplied by the number of jets in one head. Thus for the configuration of FIG. 3 the distance M is equal to 4P.

TABLE I

| | Nozzle Spacing | | | | | | | | | | |
|---|---|---|---|---|---|---|---|---|---|---|---|
| Nozzles | 2 | 3 | 4 | 5 | 6 | 7 | 8 | 9 | 10 | 11 | 12 |
| 2 | | X | | X | | X | | X | | X | |
| 3 | X | | X | X | | X | X | | X | X | |
| 4 | | X | | X | | X | | X | | X | |
| 5 | X | X | X | | X | X | X | X | | X | X |
| 6 | | | | X | | X | | | | X | |
| 7 | X | X | X | X | X | | X | X | X | X | X |
| 8 | | X | | X | | X | | X | | X | |
| 9 | X | | X | X | | X | X | | X | X | |

In accordance with this invention, it has been found that cooperatively driven heads, such as the print heads 10 and 11, can print banded areas having interlaced boundaries if the print heads are spaced apart by a distance equal to an integral number of advance distances. That is, the distance S should be selected so as to be equal to the distance M multiplied by some integer. For instance, the distance S might be in the order of about 312M for an arrangement of two heads as shown in FIG. 3.

Figure 5:
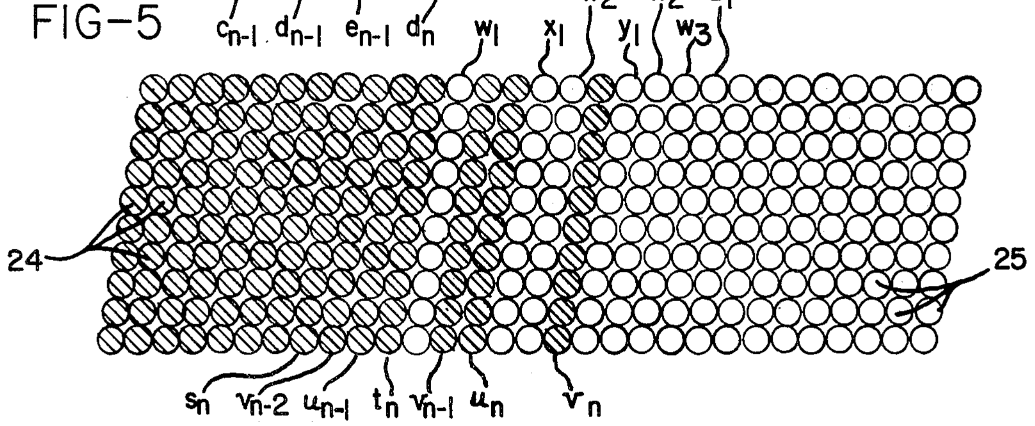
FIG. 5 illustrates the interlacing produced by two print heads having four nozzles each.

For an arrangement of print heads as illustrated in FIG. 3 there may be printed an image having band boundaries as illustrated in FIG. 5. The image comprises a series of printed dots 24 (illustrated with shading) printed by individual drops 22 generated by print head 10 and another series of printed dots 25 (illustrated without shading) printed by individual drops 22 produced by print head 11. Printed dots 24 and 25 are arranged in a series of columns denoted by letters carrying numerical subscripts. In each case the letter corresponds to one of the track designations of FIG. 3 and the numerical subscript denotes the rotation of drum 13 during which the column was printed. Thus column $w_1$ is the column printed by track w during the first rotation of drum 13. It will be noted that there is a space equal to two track widths between column $w_1$ and column $x_1$, the first column printed by track w.

The space between columns $w_1$ and $x_1$ is filled in by columns $v_{n-1}$ and $U_n$. The subscript n refers to the nth or last rotation of the drum. Thus the space is printed by track v during the next to the last rotation of drum 13 and by track u during the last rotation of the drum. While track u is printing the column $u_n$, track v is printing the column $v_n$ to fill in a blank column region between tracks $w_2$ and $y_1$. Thus print heads 10 and 11 print image bands which adjoin in an interlaced fashion.

The printing illustrated in FIG. 5 is produced by a pair of print heads, each having four jet producing nozzles which are spaced apart by a distance equal to three track widths. As taught in the above mentioned Paranjpe et al application each such head is able to print a solid image (except at the edges) because the numbers 4 and 3 have no common factor other than 1. The distance of print head advance during one revolution of drum 13 is equal to four times the width of one of the illustrated columns, and the separation between the print heads is equal to an integral number of such advance distances. For instance, if the diameter of a single printed dot is assumed to be 4 mils, then the advance distance M for the printing of FIG. 5 is equal to 16 mils, and the head separation distance S is equal to 16 mils times some integer, which might be a number in the order of about 312.

Figure 4:
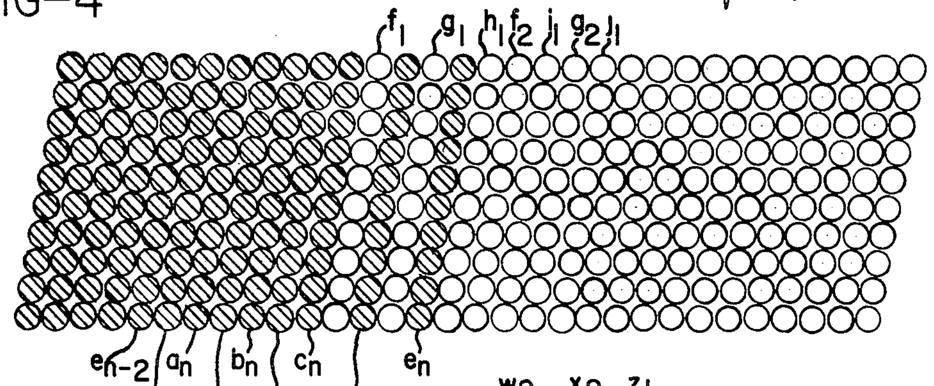
FIG. 4 illustrates the interlacing produced by two heads having five nozzles each.

FIG. 4 illustrates interlace printing which is achieved by an alternative embodiment of the invention comprising two print heads, each having five jet producing nozzles spaced on centers two track widths apart. Again the printed spots are shaded and unshaded to represent printing by the two different heads. Also the printed columns are denoted by subscripted letters, with the letters a through e referring to five helical tracks produced by one head and the letters f through j indicating five helical tracks printed by the other head. Further in accordance with this invention the print heads for producing the image of FIG. 4 are mutually advanced a distance equal to five track widths during one revolution of the printing drum, and the head spacing is equal to an integral number of such advanced distances.

While the forms of apparatus herein described constitute preferred embodiments of the invention, it is to be understood that the invention is not limited to these precise forms of apparatus, and that changes may be made therein without departing from the scope of the invention.

What is claimed is:

1.

1. In an ink jet printer apparatus comprising rotary support means, mounting means for mounting a print receiving sheet upon said support means, a plurality of jet drop print heads positioned for directing printing jets toward said sheet, first drive means for rotating said support means about an axis of rotation, second drive means for driving said print heads axially at a common speed and causing said print heads to cover said sheet with printed tracks collectively defining contiguous printed bands; the improvement wherein each of said print heads produces a plurality of jets which are spaced apart by a distance equal to a number of track widths having no factor other than one as a common factor with the number of jets produced by one of said heads and further wherein said print heads are arranged along a common line parallel to said axis of rotation with a spacing between common points of said heads equal to an integral number of advance distances for interlacing of the edges of the printed bands produced by the different heads and during one revolution of said rotary support means advance axially as aforesaid an advance distance equal to a track width multiplied by the total number of jets and divided by the number of print heads.

2. The improvement of claim 1 wherein each of said print heads produces the same number of jets.

3. The improvement of claim 2 wherein the jets produced by each head are uniformly spaced.

4. The improvement of claim 3 wherein all of said heads are configured for producing jets at the same spacing.

* * * * *